W. L. FRIEDMAN.
RECORDING THERMOMETER.
APPLICATION FILED NOV. 7, 1912.

1,105,898.

Patented Aug. 4, 1914.

3 SHEETS—SHEET 1.

WITNESSES:
F. A. Simney
A. H. Kephart

INVENTOR
W. L. FRIEDMAN
BY
Carlos P. Griffin
ATTORNEY

W. L. FRIEDMAN.
RECORDING THERMOMETER.
APPLICATION FILED NOV. 7, 1912.
1,105,898.
Patented Aug. 4, 1914.
3 SHEETS—SHEET 2.
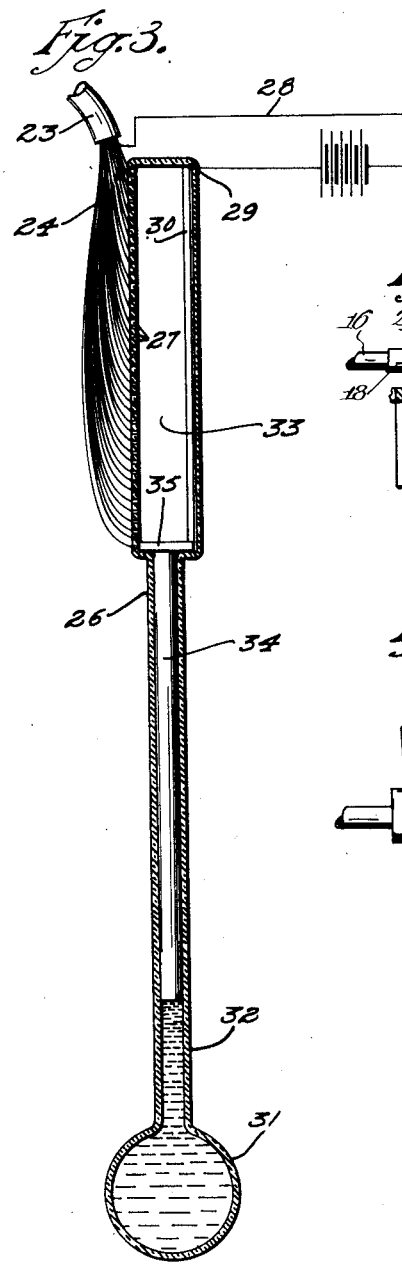
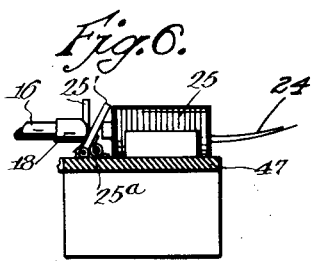
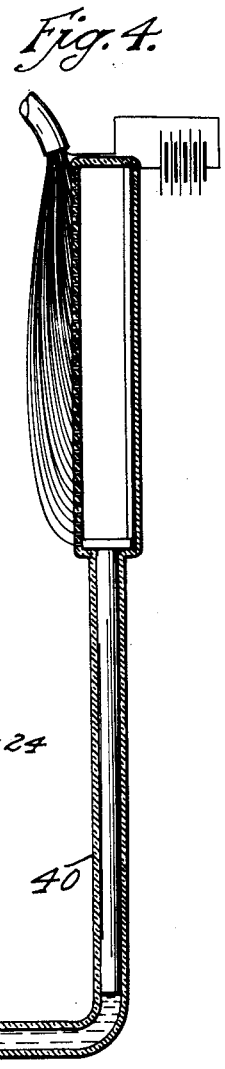
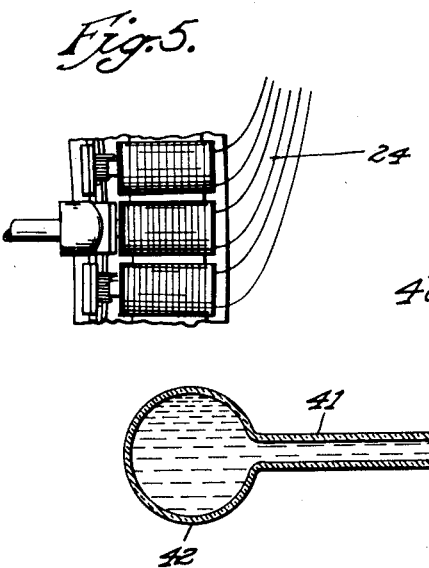
WITNESSES:
F. A. Sinney.
A. H. Kephart.
INVENTOR
W. L. FRIEDMAN
BY
Carlos P. Griffin
ATTORNEY W. L. FRIEDMAN.
RECORDING THERMOMETER.
APPLICATION FILED NOV. 7, 1912.
1,105,898.
Patented Aug. 4, 1914.
3 SHEETS—SHEET 3.
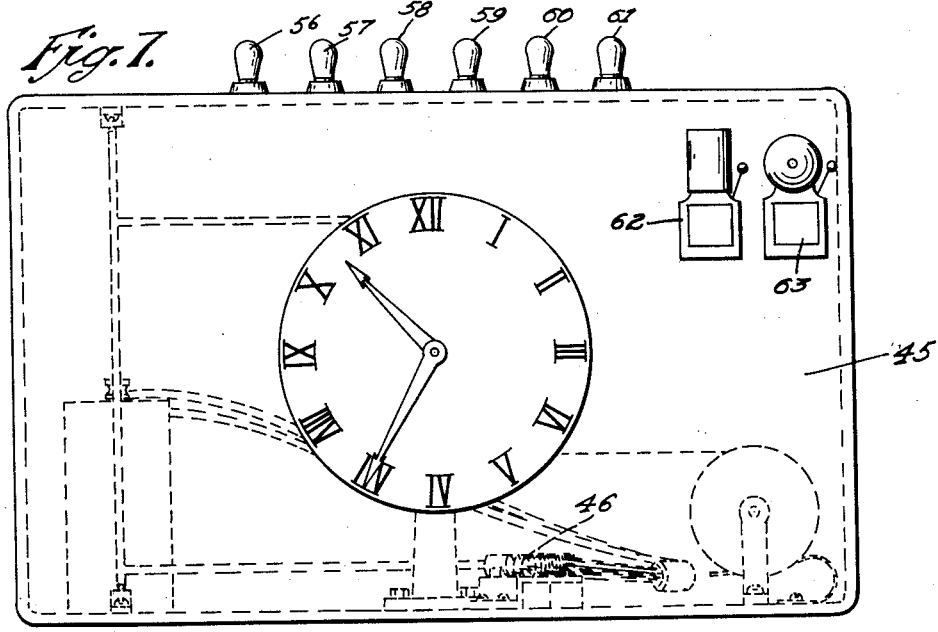
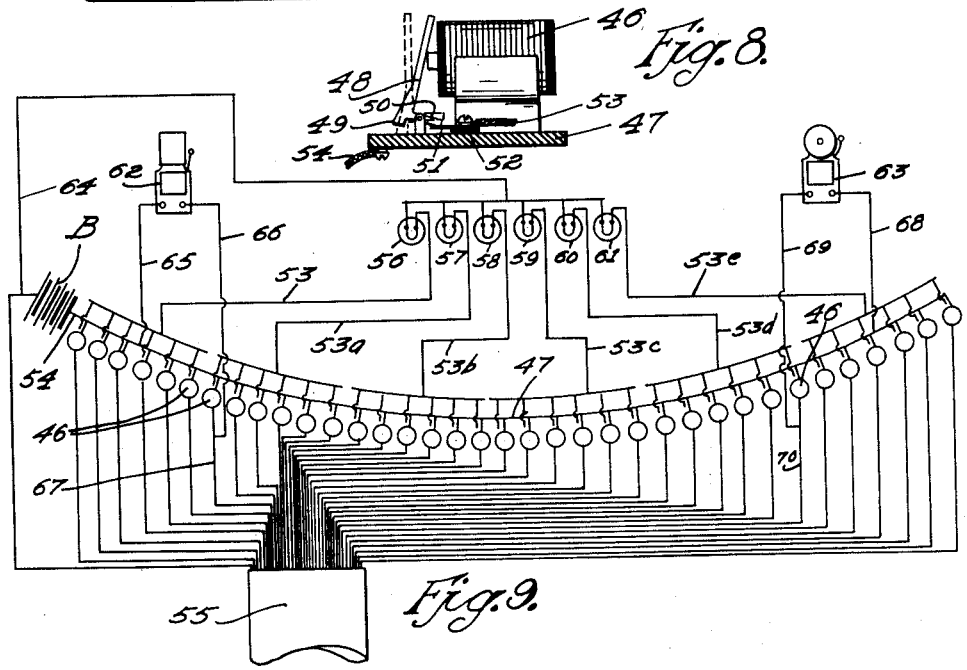
WITNESSES:
INVENTOR
W. L. FRIEDMAN
BY
Carlos P. Griffin
ATTORNEY

UNITED STATES PATENT OFFICE.

WILLIAM L. FRIEDMAN, OF OAKLAND, CALIFORNIA.

RECORDING-THERMOMETER.

1,105,898.

Specification of Letters Patent.

Patented Aug. 4, 1914.

Application filed November 7, 1912. Serial No. 730,070.

*To all whom it may concern:*

Be it known that I, WILLIAM L. FRIEDMAN, a citizen of the United States, residing at Oakland, in the county of Alameda and State of California, have invented a new and useful Recording-Thermometer, of which the following is a specification, in such full and clear terms as will enable those skilled in the art to construct and use the same.

This invention relates to a recording thermometer, and its object is to provide an accurate, automatic and continuous record of temperature changes for clinical and other purposes.

An especial object of the invention is to provide a thermometer for clinical use in taking body temperatures.

It will be understood by physicians and those skilled in medical science that in certain diseased conditions the temperature will fall suddenly from a very high to a subnormal temperature called a fall by "lysis," or again there is the so-called "step ladder fall." In order to make the most use of the thermometer in the treatment of such diseases, it is necessary to provide a continuous record in order to diagnose and differentiate the various febrile conditions. With this instrument a continuous temperature record is obtained so that it becomes possible to at once determine from the record precisely what fluctuations of temperature have occurred during any given period, thus enabling the physician to more accurately diagnose the conditions during that period.

An object of the invention is to provide a thermometer which may be left in place during any length of time necessary, the recorder indicating at all times the variations of temperature.

Another object of the invention is to provide accurate means for the indication of the rise and fall of the thermometer bead.

Figure 1:
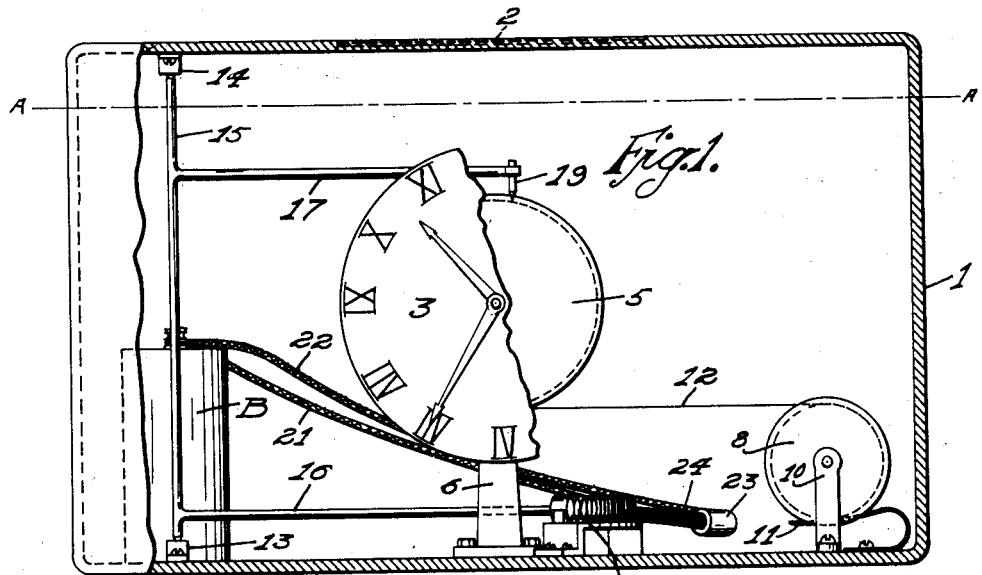
Figure 2:
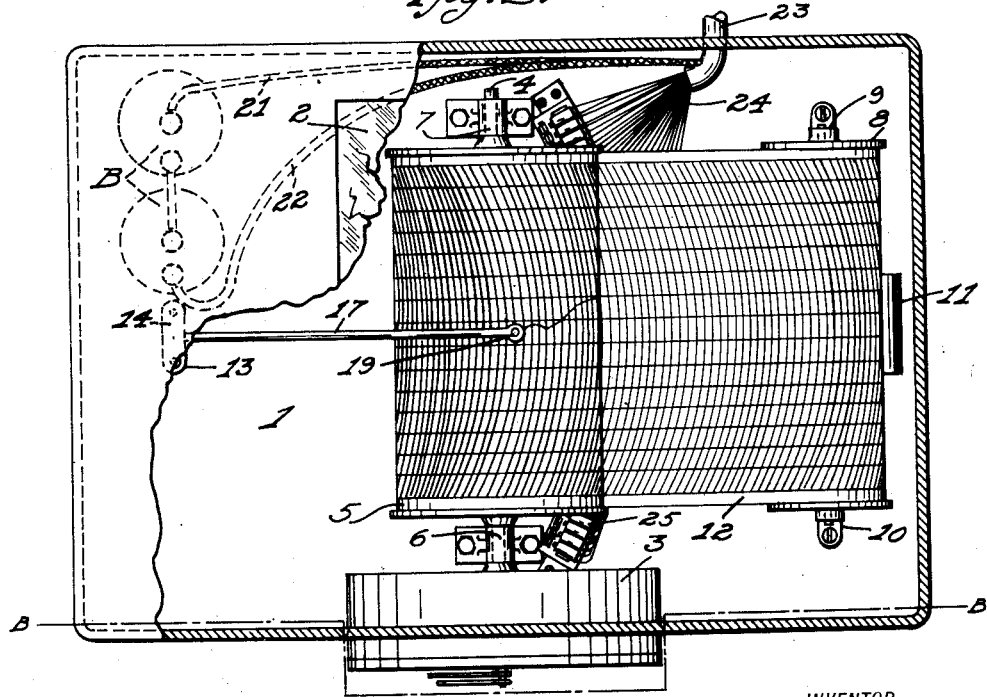

In the drawings in which the same numeral of reference is applied to the same portion, throughout the several views, Figure 1 is a side elevation of the recording mechanism, a portion of the case therefor being broken away on section line B—B Fig. 2 to show the interior apparatus, Fig. 2 is a plan view of the recording mechanism, a portion of the case therefor being broken away on the dotted line A—A Fig. 1 to show the interior thereof, Fig. 3 is a vertical sectional view of the thermometer used for making the several electrical contacts, Fig. 4 is a vertical sectional view of the thermometer having one portion thereof at right angles to another portion in order that the plunger may always be used in a substantially vertical position, Fig. 5 is a plan view of three of the magnets and a portion of the pointer used for making the record upon the cylinder, Fig. 6 is a side elevation of the magnets and a portion of the pointer used for making the record upon the cylinder, Fig. 7 is a side elevation of a recording instrument which may be used in connection with a thermometer in which visible and audible signals are used to indicate temperature changes, making the examination of the paper strip unnecessary save when it is desired to ascertain the complete record of temperature changes, Fig. 8 is a side elevation of one of the magnets used with this form of the invention, and Fig. 9 is a diagram of the electric wiring for operating the lights and bells.

The numeral 1 indicates a suitable rectangular box having a transparent window 2 through which the recording cylinder may be observed. A suitable clock 3 is inserted in an opening in the side of the case and this clock has a shaft 4 extending therefrom and upon which the cylinder 5 is mounted. This shaft is supported in uprights 6 and 7. At the end of the box there is a paper supply roll 8 mounted upon brackets 9 and 10, a spring 11 secured to the bottom of the box bearing upon the underside of the paper supply roll to prevent the paper from unwinding therefrom too rapidly. The paper strip 12 has one end suitably secured to the cylinder 5 and the clock movement causes said cylinder to wind the paper up thereon. The paper strip may be ruled upon both sides as indicated in order to provide the means for making use of each strip twice. At the end of the box opposite from the paper feed roll are two suitable bearings 13 and 14, one at the bottom and the other at the top of the box, said bearings supporting a rod 15 to which rod arms 16 and 17 are secured. The arm 16 carries a small piece of iron or other magnetic material as indicated at 18, while the arm 17 carries a suitable pencil or pen 19, said pencil bearing upon the top of the cylinder 5.

Mounted within the box are suitable batteries B from which wires 21 and 22 extend to a cable 23. The cable 23 has a plurality of wires 24 extending thereinto, two of each of said wires leading to each of the magnets 25, there being such a number of magnets as is deemed necessary to cover the desired temperature range.

In order to positively control the movement of the needle and prevent it from moving entirely away from the magnet energized, each magnet is provided with a pivoted armature 25', a wire 25ª supporting a light spring 25ᵇ adjacent and bearing on each armature 25'. The result of this construction is that the arm is locked in front of the magnet energized, the two armatures at the sides preventing it from moving till one or the other is energized. It will be seen that the pivoted armatures are caused to move outwardly away from the magnets by the light springs bearing thereupon, but these springs cannot move these armatures outwardly more than a fixed amount, since each is provided with a heel piece which bears upon the base plate P, upon which all of the magnets and their movable armatures are mounted. Also while these pivoted armatures tend to move outwardly they do not do so with sufficient force to prevent the next adjacent magnet from pulling the record arm armature away from the magnet which has just been demagnetized. It will also be understood that the pivoted armatures are of a suitable magnetic material so that their effect upon the record arm armature is substantially the same as if the magnet itself was adjacent said record arm armature.

The cable 23 extends to the thermometer 26 and the wires 24 are let into the glass of the thermometer head at a short distance from each other as indicated at 27, while a single wire 28 also extending from the cable 23 is let into the opposite side of the glass as indicated at 29 and is connected with a metallic bar 30.

The thermometer comprises the usual globe 31 for containing the desired liquid to indicate the rise and fall of temperature, a stem 32 and an enlarged chamber 33 through the walls of which the wires 24 and 28 extend. Fitted into the stem 32 is a hollow glass plunger 34, said glass plunger being carefully ground so that it fits the opening in said tube 32 as smoothly as possible. This glass plunger carries a metallic top 35, said metallic top affording a circuit between the rod 30 and any of the wires 24, with which it may be in contact. The top 35 moves in two grooves to prevent it from rotating away from the electrical circuits.

In operation the thermometer is placed in any place the temperature of which is to be recorded, as for example, the bow of a ship, or in the mouth of a fever patient and as the column of mercury within the tube 32 rises and falls, the several circuits to the different magnets will be made or broken and as these circuits are made and broken the pointer 16 will be moved from one magnet to another and will in the same way move the pointer 17. The pointer 17 will make a mark upon the paper on the cylinder 5. Since the pointer 17 moves about a center the marks upon the paper to indicate time must be curved as shown.

In Fig. 4 there is indicated a modified form of the thermometer for use in positions where it is not convenient to use the thermometer shown in Fig. 3. In this figure the top of the thermometer is precisely the same as that shown in Fig. 3, but the stem 40 is provided with a portion 41 turned at right angles to the main stem, thus enabling the bulb 42 and stem 41 to be placed in a horizontal position while the portion of the stem indicated at 40 will occupy a vertical position. It will be understood that the interior of the thermometer is under a high vacuum as is common in the art, so that there will be little resistance to the up and down movement of the stem 34.

The numeral 45 indicates the case within which the recording apparatus is installed. This apparatus is substantially the same in every respect as that illustrated in Fig. 1, except that the magnets 46 are mounted upon a base plate 47 and in front of each magnet is the pivoted armature 48, said armature having a heel piece 49 to prevent it from falling too far away from the magnet, and it has a rearward extension 50 which makes contact with a spring 51. This spring is suitably supported on the base plate 47 by means of an insulated block 52 and it has an electric wire 53 connected therewith. Connected with the underside of the plate 47 is a wire 54 which extends to the battery B.

All of the electric wires extending from the recording apparatus to the thermometer are incased in a suitable cable 55, the same as the cable 23. Mounted upon the top of the casing 45 are six lights 56, 57, 58, 59, 60 and 61. These lights may be of different colors in order that the attention of the attendant may be readily drawn to the changes in them. On the side of the casing 45 are two bells 62 and 63, said bells being of such shape as to give characteristic tones.

The diagram of the wiring (Fig. 9) illustrates the manner of operating the lights and bells with changes in the temperature at the thermometer. The lights are operated from the battery by means of the wires 54 and 64 and the several wires 53ª, 53ᵇ, 53ᶜ, 53ᵈ and 53ᵉ. The wires 53 to 53ᵉ inclusive are so connected that the energizing of any one of the six magnets in a series will operate one of the lights 56 to 61 inclusive, the entire temperature range being thus divided into six parts for convenient visual observation.

In order that there may be an audible signal at a high or low point the bells 62 and 63 are used. The bell 62 has a wire 65 extending to and connected with the base plate 47, to which the wire 53 is connected and it has a wire 66 connected with one of the outgoing leads 67 of one of the magnets 46 of the series at a point near one end of the set. In the same way the bell 63 has a wire 68 connected to the base plate 47, and it has a wire 69 connected to one of the outgoing leads 70 of one of the magnets 46 near the other end of the series, so that if the temperature goes unduly low or unduly high the bells will give notice thereof in addition to the notice given by the change in the lights. It will be understood that the record mechanism with this form of the invention is substantially the same as that shown in Fig. 1.

It will be understood that in order to have a plunger of such size as tto be operable for the purpose herein desired, that it is necessary to have the bead of the thermometer larger than is commonly the case with the ordinary thermometers, and in order to give the plunger the necessary travel the quantity of indicating fluid in the bulb must be considerably greater than with the ordinary thermometer. It is also to be noticed that the metal tip at the top of the plunger must be so shaped as to travel up and down without disturbing the contacts it makes with the several circuits, and this is accomplished by having the sides of the thermometer tube grooved.

Having thus described my invention what I claim as new and desire to secure by Letters Patent of the United States, is as follows:

1. In a recording device, a thermometer, electrical circuits connected therewith, means in the thermometer to close different electrical circuits upon temperature changes, a record strip, a series of magnets connected with said circuits, and a record arm movable over the record strip upon the energizing of said magnets, substantially as described.

2. In a recording device, a thermometer, electrical circuits connected therewith, means in the thermometer to close different electrical circuits upon temperature changes, a record strip, a series of magnets connected with said circuits, a record arm movable over the record strip, and an armature locked in proximity to said magnets and moved thereby when said magnets are energized to cause the record arm to move over the record strip to make a record thereon, substantially as described.

3. In a recording device, a thermometer, electrical circuits connected therewith, means in the thermometer to close different electrical circuitts upon temperature changes, a record strip, means to move said record strip at a fixed rate, a series of magnets connected with said circuits, a record arm movable over the record strip, and an armature adjacent the magnets for moving the arm over the record strip to make a record thereon, substantially as described.

4. In a recording device, a thermometer, electrical circuits connected therewith, means in the thermometer to close different electrical circuits upon temperature changes, a record strip, means to move said record strip longitudinally at a determinate rate, a series of magnets connected with said circuits, a record arm movable over the record strip to make a record thereon, an armature adjacent the magnets, and means to lock the armature adjacent the particular magnet energized, substantially as described.

5. In a recording device, a thermometer, electrical circuits connected therewith, means in the thermometer to close different electrical circuits upon temperature changes, a record strip, means to move said record strip longitudinally at a determinate rate, a series of magnets connected with said circuits, a pivoted armature adjacent each magnet, and an armature carried by the record arm and close enough to the magnets to be locked adjacent the magnet energized by the two next adjacent armatures, substantially as described.

6. In a recording device, a thermometer, electrical circuits connected therewith, means in the thermometer to close different electrical circuits upon temperature changes, a record strip, means to move said record strip longitudinally at a determinate rate, a series of magnets connected with said circuits, a record arm movable over the record strip, an armature adjacent said magnets and carried by the record arm, and means to prevent the armature from shifting from one magnet to another until the first magnet has been demagnetized, substantially as described.

7. In a recording device, a thermometer, a bulb thermometer, a plunger therein, a suitable fluid material in said thermometer and in contact with said plunger for moving the latter upon temperature changes, a series of electrical circuits connected with said thermometer, means carried by the plunger to close different electrical circuits upon temperature changes, a record strip, a series of magnets, and means operated by said magnets for making a record upon said strip, substantially as described.

8. In a recording device, a thermometer, electrical circuits connected therewith, a suitable temperature indicating fluid in said thermometer, a plunger in said thermometer and in contact with said fluid, means carried by the plunger to close different electrical circuits upon temperature changes, a record strip, means to move said record strip at a determinate rate, a series of magnets connected with said circuits, and a record arm having means operated by the magnets to move said arm over said strip, substantially as described.

9. A recording instrument comprising a thermometer, electrical circuits connected therewith, means carried by the thermometer to close certain of the electrical circuits upon temperature changes, a recording apparatus comprising a movable arm to produce the record, movable armatures to secure the arm in a given position, and a series of visible electrical signals operated upon temperature changes at the thermometer by closing certain of said electrical circuits, substantially as described.

10. A recording instrument comprising a thermometer, electrical circuits connected therewith, means operated by the thermometer to close certain of said circuits, a record apparatus comprising a movable arm to produce a record, movable armatures to secure the arm in a given position, and audible signals connected with the apparatus and operated by temperature changes at the thermometer by said armatures closing certain circuits, substantially as described.

11. In a recording instrument, a thermometer, electrical circuits connected therewith, means carried by the thermometer to close certain of said circuits, a recording apparatus comprising a movable arm to produce the record, movable armatures to secure the arm in a given position, and a series of visible and audible signals operated by said armatures closing certain of said electrical circuits, substantially as described.

In testimony whereof I have hereunto set my hand this 25" day of October A. D. 1912, in the presence of two subscribed witnesses.

WILLIAM L. FRIEDMAN.

Witnesses:
C. P. GRIFFIN,
HENRY B. LESTER.